(12) United States Patent
McMullin (10) Patent No.: US 9,293,920 B2
(45) Date of Patent: Mar. 22, 2016

(54) SYSTEMS AND METHODS FOR SYNCHRONIZING SWITCHING WITHIN A POWER DISTRIBUTION NETWORK

(75) Inventor: Dale Robert McMullin, Canton, GA (US)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 13/075,568

(22) Filed: Mar. 30, 2011

(65) Prior Publication Data

US 2012/0253539 A1 Oct. 4, 2012

(51) Int. Cl.
| | |
|---|---|
| G06F 1/28 | (2006.01) |
| H02J 3/00 | (2006.01) |
| H02J 3/14 | (2006.01) |
| H02J 13/00 | (2006.01) |
| H02J 3/38 | (2006.01) |

(52) U.S. Cl.
CPC . *H02J 3/006* (2013.01); *H02J 3/14* (2013.01); *H02J 13/0013* (2013.01); *H02J 3/381* (2013.01); *Y02B 70/3225* (2013.01); *Y04S 20/222* (2013.01)

(58) Field of Classification Search
CPC ....... H02J 3/382; H02J 3/006; H02J 13/0013; H02J 3/14; H02J 3/381; G06G 7/635; Y02E 10/723; Y02E 10/72; Y04S 20/222; Y02B 70/3225
USPC .................................................. 700/287, 297
See application file for complete search history.

(56) References Cited

U.S. PATENT DOCUMENTS

| | | | |
|---|---|---|---|
| 8,032,260 B2 * | 10/2011 | Hill et al. ...................... 700/293 |
| 8,793,202 B2 * | 7/2014 | Wang et al. ..................... 706/13 |
| 8,812,165 B1 * | 8/2014 | Smith et al. ................... 700/291 |
| 2005/0168326 A1 * | 8/2005 | White et al. ............. 340/310.01 |
| 2005/0169056 A1 * | 8/2005 | Berkman et al. .......... 365/185.22 |
| 2008/0224546 A1 * | 9/2008 | TeSelle et al. ................ 307/125 |
| 2008/0319893 A1 * | 12/2008 | Mashinsky et al. ............. 705/37 |
| 2011/0022239 A1 | 1/2011 | Forbes, Jr. et al. |
| 2011/0029148 A1 * | 2/2011 | Yang et al. .................... 700/297 |
| 2011/0066296 A1 * | 3/2011 | Nelson et al. ................. 700/286 |
| 2012/0179301 A1 * | 7/2012 | Aivaliotis et al. ............. 700/286 |
| 2012/0239601 A1 * | 9/2012 | Wang et al. ..................... 706/13 |

OTHER PUBLICATIONS

Search Report issued in connection with NZ Patent Application No. 599057, Mar. 30, 2012.

* cited by examiner

*Primary Examiner* — Mohammad Ali
*Assistant Examiner* — Ziaul Karim
(74) *Attorney, Agent, or Firm* — Sutherland Asbill & Brennan LLP (57) ABSTRACT

Systems and methods for synchronizing switching within a power distribution network are provided. A switch plan for restoring electrical power to a power distribution network following a power outage may be identified by a control system. The control system may be associated with a power utility and may include one or more computers. A plurality of switching operations associated with the switch plan may be identified by the control system. The plurality of switching operations may include at least one automatic switching operation and at least one manual switching operation. A synchronized execution of the plurality of switching operations may be coordinated by the control system.

12 Claims, 3 Drawing Sheets

SYSTEMS AND METHODS FOR SYNCHRONIZING SWITCHING WITHIN A POWER DISTRIBUTION NETWORK

FIELD OF THE INVENTION

Embodiments of the invention relate generally to power distribution networks, and more specifically to systems and methods for synchronizing switching within a power distribution network.

BACKGROUND OF THE INVENTION

Power distribution networks, such as an electrical power grid, arc utilized to deliver electrical power from power supplies to consumers or customers. Following an interruption in power, such as a power outage, a power distribution network is typically re-energized or restored by actuating a plurality of switches throughout the power distribution network. Typically, both automatic switches and manual switches are included in the network. The automatic switches are typically controlled by a control system, such as a Supervisory Control and Data Acquisition ("SCADA") associated with a utility provider, while the manual switches are controlled by field technicians.

With the combination of automatic and manual switches, safety concerns may be encountered during the restoration of power. For example, a safety hazard might exist if switches are actuated out of order, thereby energizing a section of the network at which a field technician is working. Accordingly, systems and methods for synchronizing switching operations within a power distribution network are desirable.

BRIEF DESCRIPTION OF THE INVENTION

Some or all of the above needs and/or problems may be addressed by certain embodiments of the invention. Embodiments of the invention may include systems and methods for synchronizing switching within a power distribution network. According to one embodiment of the invention, there is disclosed a method for synchronizing switching within a power distribution network. A switch plan for restoring electrical power to a power distribution network following a power outage may be identified by a control system. The control system may be associated with a power utility and may include one or more computers. A plurality of switching operations associated with the switch plan may be identified by the control system. The plurality of switching operations may include at least one automatic switching operation and at least one manual switching operation. A synchronized execution of the plurality of switching operations may be coordinated by the control system.

According to another embodiment of the invention, there is disclosed a system for synchronizing switching within a power distribution network. The system may include at least one memory and at least one processor. The at least one memory may be configured to store computer-executable instructions. The at least one processor may be configured to access the at least one memory and execute the computer-executable instructions to (i) identify a switch plan for restoring electrical power to a power distribution network following a power outage; (ii) identify a plurality of switching operations associated with the switch plan, the plurality of switching operations comprising at least one automatic switching operation and at least one manual switching operation; and (iii) coordinate a synchronized execution of the plurality of switching operations.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for synchronizing switching within a power distribution network, such as an electrical power grid. In various embodiments of the invention, a suitable switching control system, such as a switching control system associated with a utility provider, may be provided. The switching control system may direct switching operations within the power distribution network or a portion of the power distribution network. In this regard, the switching control system may synchronize switching operations during a restoration of power to the power distribution network. In certain embodiments, the switching control system may synchronize the execution of automatic switching operations and manual switching operations.

In one example embodiment, a switching control system may identify a switch plan, such as a switch plan associated with restoring power to a power distribution network. Additionally, a plurality of switching operations associated with the switch plan may be identified and/or determined. The switching operations may include both automatic switching operations and manual switching operations. Once the plurality of switching operations has been identified, an order for executing the switching operations may be determined. The switching control system may then direct the execution of the plurality of switching operations in accordance with the determined order. In this regard, the switching control system may ensure that prerequisite switching operations are performed prior to the execution of later switching operations.

For each switching operation, the switching control system may identify a wide variety of different information associated with the switching operation. For example, the switching control system may determine whether the switching operation is an automatic switching operation or a manual switching operation. If it is determined that the switching operation is an automatic switching operation, then the switching control system may direct an automatic execution of the switching operation. For example, the switching control system may direct a SCADA system to execute the switching operation. The switching control system may then receive an indication from the SCADA system that the switching operation has been executed, and the switching control system may direct the execution of one or more subsequent switching operations based at least in part upon receipt of the indication. Similarly, if it is determined that the switching operation is a manual switching operation, then the switching control system may direct a manual execution of the switching operation. For example, the switching control system may direct the communication of an instruction to execute the switching operation to one or more user devices (e.g., cell phones, mobile computers, etc.) associated with one or more field technicians. Once the manual switching operation has been completed by the field technicians, the switching control system may receive an indication that the switching operation has been completed, and the switching control system may execute one or more subsequent operations based at least in part upon the received indication. In this regard, the execution of automatic and manual switching operations may be synchronized and/or coordinated by the switching control system, thereby facilitating a relatively safe and a relatively efficient execution of a switch plan.

Additionally, in certain embodiments, the switching control system may interact with any number of other systems associated with a utility provider, such as a load balancing system, an asset management system, and/or any number of distributed energy resources. As desired, the switching control system may notify one or more of the other systems of switching operations that have been performed and/or that will be performed. Additionally, the switching control system may receive information from one or more of the other systems and, as desired, the switching control system may modify a switch plan based at least in part upon the received information. In this regard, the switching control system may dynamically adjust a switch plan based upon one or more conditions associated with the power distribution network.

Various embodiments of the invention may include one or more special purpose computers, systems, and/or particular machines that facilitate the synchronization of switching operations. A special purpose computer or particular machine may include a wide variety of different software modules as desired in various embodiments. As explained in greater detail below, in certain embodiments, these various software components may be utilized to identify a switch plan and synchronize the execution of automatic and manual switching operations associated with the switch plan.

Certain embodiments of the invention described herein may have the technical effect of synchronizing switching operations associated with the restoration of power to a power distribution network. For example, a suitable order for executing automatic and manual switching operations may be determined and directed. In this regard, relatively efficient and safe switching operations may be directed. Additionally, certain embodiments may have the technical effect of notifying other utility provider systems of various switching operations. In this regard, relatively stable conditions (e.g., load balancing, etc.) may be maintained within the power distribution network, and maintenance procedures may be scheduled to coordinate with switching operations.

Figure 1:
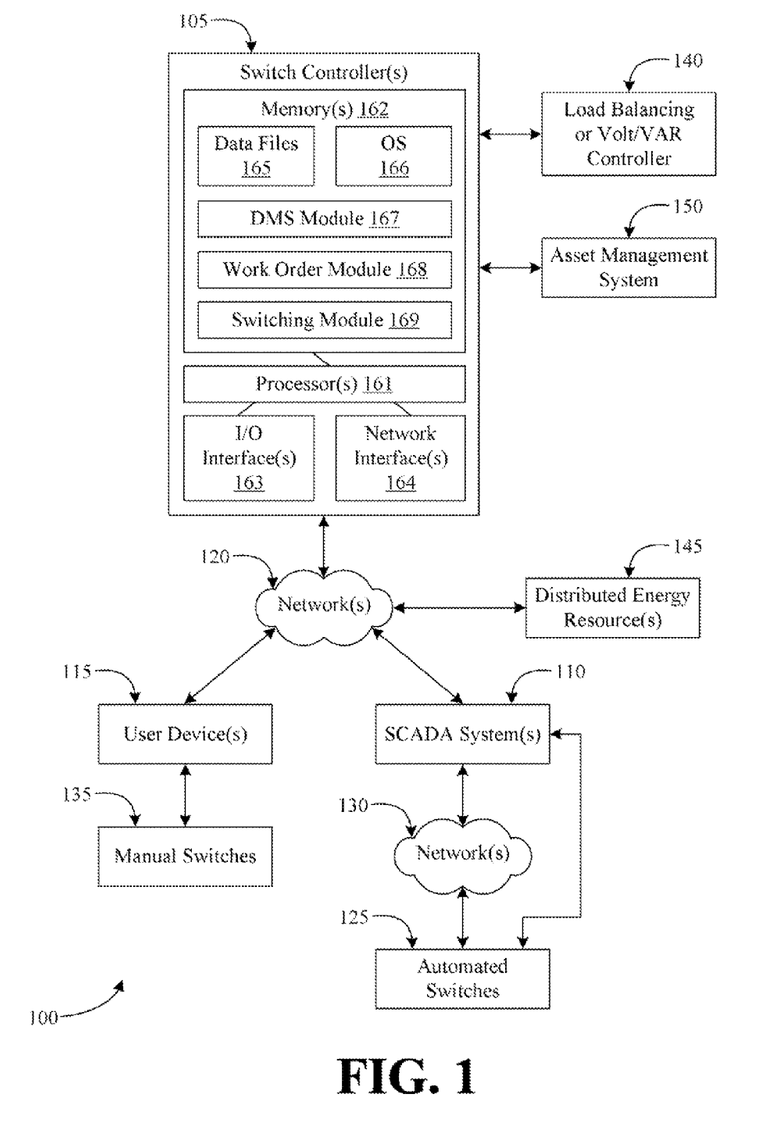
FIG. 1 is a block diagram of one example system that facilitates synchronized switching within a power distribution network, according to an illustrative embodiment of the invention.

FIG. 1 is a block diagram of one example system 100 that facilitates synchronized switching within a power distribution network, according to an illustrative embodiment of the invention. The system 100 illustrated in FIG. 1 may include, for example, one or more switch controllers 105, one or more SCADA systems 110, and/or one or more user devices 115. In certain embodiments, one or more components of the system 100 may be associated with a utility provider. As desired, one or more of the components of the system 100 may include one or more suitable computers configured to control operations within the system 100 and/or to facilitate communication with other components of the system 100. Suitable computer components associated with a switch controller 105 are described in greater detail. Other components may include computers or other processor-driven devices that include components similar to the switch controller 105. Additionally, in certain embodiments, various components of the system 100, such as the switch controller 105, the SCADA system 110, and/or the user devices 115 may be in communication with one another via any number of suitable networks 120.

In operation, the switch controller 105 may identify and direct the execution of a switch plan. For example, a switch plan may be executed in order to restore power to a power distribution network (e.g., an electrical power grid) following a power outage. The switch controller 105 may identify automatic and manual switching operations included in the switch plan, and the switch controller 105 may synchronize the execution of the automatic and manual switching operations. In doing so, the switch controller 105 may direct the communication of execution instructions to the SCADA system 110 and/or to the user devices 115. The SCADA system 110 may include any number of suitable supervisory control and data acquisition systems and/or components associated with the utility provider. The SCADA system 110 may direct the actuation of any number of automated or automatic switches 125 associated with the power distribution network. In certain embodiments, the SCADA system 110 may direct the actuation of one or more automated switches 125 via one or more suitable networks 130, such as a local area network, a wide area network, a cellular network, the Internet, an Automated Metering Infrastructure network, etc.). Additionally or alternatively, the SCADA system 110 may direct the actuation of automated switches 125 via any number of suitable direct connections.

Similarly, any number of user devices 115 may be configured to receive execution instructions from the switch controller 105. For example, user devices 115 associated with field technicians, such as portable computers and/or mobile devices, may be configured to receive execution instructions. The execution instructions may be presented to users of the user devices 115, such as field technicians, and the users may manually control the actuation of one or more manual switches 135 based at least in part upon the received instructions. Once switching operations have been completed by the SCADA system 110 and/or the users, any number of suitable indications and/or messages may be returned to the switch controller 105. The switch controller 105 may control the execution of subsequent switching operations included in the switch plan based at least in part upon the received indications.

With continued reference to FIG. 1, any number of other systems and/or devices associated with a utility provider (and/or customers of the utility provider) may be provided, for example, a load balancing controller 140, any number of distributed energy resources ("DERs") 145, and/or an asset management system 150. During the execution of a switch plan, the switch controller 105 may communicate notifications, messages, and/or instructions to one or more of the other systems. In this regard, the operations of the other systems may be adjusted based at least in part on the switching operations. Additionally, as desired, the switch plan may be adjusted based at least in part upon information communicated by other systems to the switch controller 105.

The load balancing controller 140, which may also be referred to as a volt/volt-ampere reactive ("VAR") controller, may include any number of suitable systems, devices, and/or software components that facilitate the execution of phase and/or load balancing analyses within the power distribution network. During the execution of a switch plan, the load balancing controller 140 may conduct a load balancing analysis in order to determine whether any load balancing (i.e., balancing of power generation and power demand) should be performed within the power distribution network. In certain embodiments, based upon a determination that the power distribution network is not balanced, the load balancing controller 140 may direct or request the switch controller 105 to direct additional switching operations in order to facilitate load balancing. For example, additional switches for capacitor banks, voltage regulators, and/or on-load tap chargers may be actuated in order to facilitate load balances. As desired, any number of load balancing analysis operations may be performed. For example, load balancing analyses may be periodically performed during the execution of a switch plan and/or performed following the incremental execution of a predetermined number of switching operations.

Additionally, in certain embodiments, load balancing information may be examined by the switch controller 105 and/or the load balancing controller 140 in order to determine an optimal switch plan. As desired, a switch plan may be dynamically modified or adjusted based upon load balancing information. In this regard, relatively stable load conditions (e.g., voltage conditions, frequency conditions, reactive power conditions, etc.) may be maintained within the power distribution network during the execution of a switch plan. In certain embodiments, the switch controller 105 and/or the load balancing controller 140 may optimize a switch plan for load balancing purposes. In this regard, the vacillating actuation (i.e., opening and closing) of one or more switches may be reduced and/or avoided. As a result, certain load balancing operations may be suppressed during the execution of a switch plan.

The DERs 145 may include any number of distributed energy resources or sources associated with the power distribution network. A DER 145 may include any number of suitable energy sources and/or various control hardware and/or software components that facilitate control of the energy sources and/or communication with the switch controller 105. Examples of distributed energy resources include, but are not limited to, photovoltaic cells and/or arrays (e.g., solar panels), wind turbines, electrical generators (e.g., gas generators, etc.), and/or any number of power storage devices, such as batteries, capacitor banks, etc. DERs 145 may include devices operated by the utility provider and/or devices associated with various customers of the utility provider, including microgrid or local power grid (e.g., a neighborhood power grid that may be executed in an island mode in the event of a power outage or disconnection from a main power grid, etc.) devices and/or applications.

During the execution of a switch plan, the switch controller 105 may communicate any number of notifications to a DER 145. In this regard, the DER 145 may identify switching operations that have been performed and/or switching operations that will be performed. The DER 145 may conduct an analysis of the switching operations in order to determine an impact or potential impact that the switching operations may have on power delivery associated with the DER 145. In this regard, the DER 145 may avoid the curtailment of power, and power may continue to be provided by the DER 145 during the execution of the switch plan.

The asset management system 150 may include information associated with any number of components and/or systems associated with a utility provider, such as power substation components, transformers, power lines, and/or any other suitable components. Additionally, the asset management system 150 may monitor and/or schedule maintenance of the various components and/or systems. For example, the asset management system 150 may coordinate routine maintenance procedures. During the execution of a switch plan, the switch controller 105 may communicate any number of notifications to the asset management system 150. For example, the switch controller 105 may communicate identification information for areas of the power distribution network that will be isolated and/or de-energized for a given time period. Based at least in part upon the received information, the asset management system 150 may schedule and/or reschedule maintenance procedures for the isolated areas. Alternatively, maintenance information may be provided to the switch controller 105, and the switch controller 105 may schedule or reschedule maintenance procedures. As one example, the asset management system 150 and/or the switch controller 105 may reschedule a maintenance procedure for one or more components or systems to coincide with a time period in which the components or systems will be de-energized.

Additionally, in certain embodiments, the switch controller 105 may modify the switch plan in order to facilitate maintenance. For example, maintenance information (e.g., scheduled maintenance information, rescheduled maintenance information, etc.) may be received by the switch controller 105, and the switch controller 105 may dynamically modify a switch plan to facilitate the maintenance.

With reference to the switch controller 105, any number of computers and/or other computer processing components may be incorporated into or otherwise associated with the switch controller 105. The processing components may control operations of the switch controller 105, including the synchronization of switching operations. Examples of suitable processing devices that may be incorporated into or otherwise associated with a switch controller 105 include, but are not limited to, server computers, personal computers, application-specific circuits, microcontrollers, minicomputers, other computing devices, and the like. As such, the switch controller 105 may include any number of processors 161 that facilitate the execution of computer-readable instructions. By executing computer-readable instructions, the switch controller 105 may include or form a special purpose computer or particular machine that facilitates the synchronization of switching instructions.

In addition to one or more processor(s) 161, the switch controller 105 may include one or more memory devices 162, one or more input/output ("I/O") interfaces 163, and/or one or more network interfaces 164. The one or more memory devices 162 or memories may include any suitable memory devices, for example, caches, read-only memory devices, random access memory devices, magnetic storage devices, etc. The one or more memory devices 162 may store data, executable instructions, and/or various program modules utilized by the switch controller 105, for example, data files 165, an operating system ("OS") 166, a distribution management system ("DMS") module 167, a work order module 168, and/or a switching module 169. The data files 165 may include any suitable data that facilitates the operation of the switch controller 105 including, but not limited to, information that facilitates communication with one or more other components of the system 100, information associated with one or more stored switch plans, information associated with one or more switching instructions, information associated with distributed switches, information associated with other components of the system (e.g., the SCADA system 110, the user devices 115, the load balancing controller 140, the distributed energy resources 145, and/or the asset management system 150), information received from other components of the system (e.g., indications that switching operations have been completed, load balancing information, power delivery information, maintenance information, etc.), and/or information associated with the execution of a switch plan. The OS 166 may include executable instructions and/or program modules that facilitate and/or control the general operation of the switch controller 105. Additionally, the OS 166 may facilitate the execution of other software programs and/or program modules by the processors 161, such as the DMS module 167, the work order module 168, and/or the switching module 169.

The DMS module 167 may be a suitable software module or application configured to manage the state of the power distribution network in real time. Additionally, the DMS module 167 may be configured to facilitate communication with the SCADA system 110. In operation, the DMS module 167 may receive an instruction from the switching module 169 to communicate a switching instruction to the SCADA system 110. The DMS module 167 may generate a suitable message associated with the instruction and direct communication of the generated message to the SCADA system 110. Additionally, the DMS module 167 may receive information from the SCADA system 110, such as an indication that an instructed switching operation has been completed, and the DMS module 167 may forward at least a portion of the received information to the switching module 169.

The work order module 168 may be a suitable software module or application configured to communicate with one or more user devices 115 associated with field technicians and/or field crews. For example, the work order module 168 may be configured to generate and/or format messages communicated to the user devices 115. As another example, the work order module 168 may be configured to receive communications from the user devices 115. In operation, the work order module 168 may receive an instruction from the switching module 169 to communicate a switching instruction to a field operative. The work order module 168 may identify a user device 115 associated with the field operative, and the work order module 168 may generate and direct the communication of a suitable message associated with the instruction to the user device 115. Additionally, the work order module 168 may receive information from the user device 115, such as an indication that an instructed switching operation has been completed, and the work order module 168 may forward at least a portion of the received information to the switching module 169.

The switching module 169 may be a suitable software module or application configured to identify and coordinate the execution of a switch plan associated with a power distribution network, such as a switch plan to restore power to the power distribution network. In operation, the switching module 169 may identify a plurality of switching operations associated with a switch plan, and the switching module 169 may direct the synchronized execution of the switching operations. In this regard, the switching module 169 may facilitate a relatively efficient execution of the switching operations in a manner that ensures the safety of field technicians. Additionally, the switching module 169 may generate and direct the communication of any number of notifications to other components of the system 100, such as a load balancing controller 140, one or more DERs 145, and/or an asset management system 150. In this regard, the operations of the other components may take the switch plan into consideration and, as desired, the switch plan may be dynamically modified to facilitate one or more additional goals, such as load balancing and/or maintenance goals.

A few examples of the operations that may be performed by the switching module 169 are described in greater detail below with reference to FIGS. 2 and 3.

Although the DMS module 167 and the work order module 168 are described as software modules associated with the switch controller 105, one or more of these modules may be implemented as a combination of hardware and/or software. For example, a DMS system may be provided in certain embodiments of the invention.

With continued reference to the switch controller 105, the one or more I/O interfaces 163 may facilitate communication with any number of suitable input/output devices, such as a display, a keypad, a mouse, a keyboard, a microphone, a control panel, a touch screen display, etc., that facilitate user interaction with the switch controller 105. In this regard, user commands may be locally received by the switch controller 105. Additionally, information may be displayed and/or otherwise output to a user. The one or more network interfaces 164 may facilitate connection of the switch controller 105 to any number of suitable networks, such as the networks 120 illustrated in FIG. 1. In this regard, the switch controller 105 may receive data from and/or communicate data to other components of the system 100.

In certain embodiments, various components of the system 100 may be in communication with one another via any number of suitable networks 120, 130. Examples of suitable networks include, but are not limited to, local area networks, wide area networks, the Internet, cellular networks, Automated Metering Infrastructure ("AMI") networks, various dedicated networks, etc.

As desired, embodiments of the invention may include a system 100 with more or less than the components illustrated in FIG. 1. Additionally, certain components of the system 100 may be combined in various embodiments of the invention. The system 100 of FIG. 1 is provided by way of example only.

Figure 2:
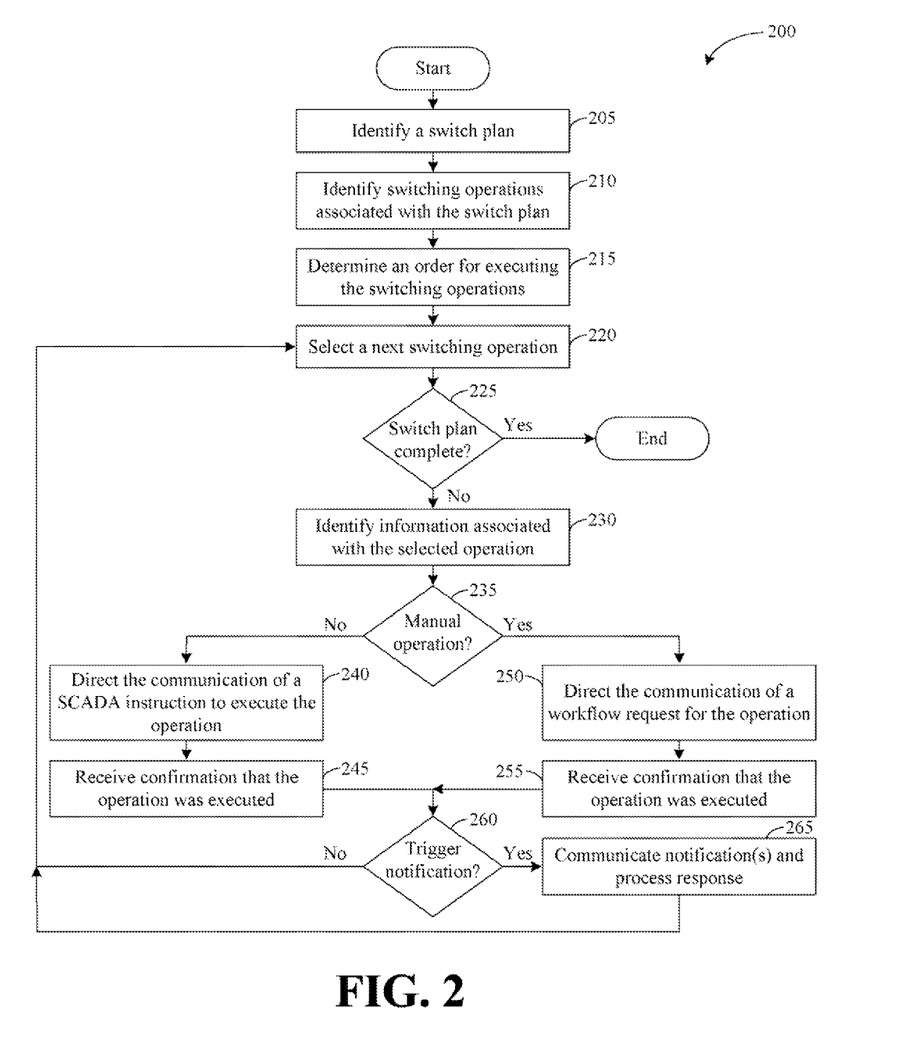
FIG. 2 is a flow diagram of an example method for executing a switch plan, according to an illustrative embodiment of the invention.

FIG. 2 is a flow diagram of an example method 200 for executing a switch plan, according to an illustrative embodiment of the invention. The method 200 may be utilized in association with one or more switching control systems, such as the system 100 illustrated in FIG. 1. In certain embodiments, various operations of the method 200 may be performed by a suitable switching module, such as the switching module 169 illustrated in FIG. 1.

The method 200 may begin at block 205. At block 205, a switch plan may be identified and/or accessed by the switching module 169. In certain embodiments, a switch plan associated with one or more areas of a power distribution network that have been de-energized may be accessed and/or identified. In other embodiments, a switch plan may be generated for one or more areas of the power distribution network.

At block 210, any number of switching operations associated with the switch plan may be identified. The switching operations may include automatic switching operations and manual switching operations. An order for executing the switching operations may be determined at block 215. In certain embodiments, the execution order may be defined by the switch plan. In other embodiments, a predetermined switch plan may be modified by the switching module 169 in order to determine a desired and/or optimal order for executing the switching operations. In either case, the execution order may define prerequisite switches that should be actuated prior to the actuation of one or more other switches. Additionally, as desired, the execution order may define various switching operations that may be executed in parallel.

At block 220, a next switching operation may be selected for processing by the switching module 169. For example, a next switching operation may be selected from a queue of switching operations associated with the switch plan. At block 225, a determination may be made as to whether the execution of the switch plan has been completed. If it is determined at block 225 that the execution of the switch plan has been completed, then operations may end. If, however, it is determined at block 225 that the execution of the switch plan has not been completed, then operations may continue at block 230.

At block 230, information associated with the selected switching operation may be identified. As desired, a wide variety of information associated with the switching operation may be identified, such as a switch associated with the switching operation and/or a type (e.g., automatic or manual) associated with the switching operation. At block 235, a determination may be made as to whether the selected switching operation is a manual switching operation. In other words, a type associated with the switching operation may be analyzed in order to determine whether the switching operation is a manual operation or an automatic operation.

If it is determined at block 235 that the switching operation is not a manual switching operation, then the switching operation may be identified as an automatic switching operation, and operations may continue at block 240. At block 240, the switching module 169 may direct that an instruction to execute the switching operation be communicated to a suitable control system. For example, the switching module 169 may direct a suitable DMS module, such as the DMS module 167 illustrated in FIG. 1, to communicate a SCADA instruction to a suitable SCADA system, such as the SCADA system 110 illustrated in FIG. 1. In this regard, the switching module 169 may direct the SCADA system 110 to automatically actuate (i.e., open or close) one or more automatic switches associated with the switching operation. Additionally, at block 245, the switching module 169 may receive an indication or message including confirmation that the switching operation has been completed. In certain embodiments, the switching module 169 may await receipt of confirmation prior to advancing within a queue of switching operations. In this regard, the switching module 169 may ensure that prerequisite switching operations are completed prior to the execution of one or more other switching operations, thereby enhancing the safety of field technicians and/or reducing equipment damage. Following block 245, operations may continue at block 260 described in greater detail below.

If, however, it is determined at block 235 that the switching operation is a manual switching operation, then operations may continue at block 250. At block 250, the switching module 169 may direct that an instruction to execute the switching operation be communicated to a suitable user device associated with a field technician or field crew. For example, the switching module 169 may direct a suitable work order module, such as the work order module 168 illustrated in FIG. 1, to communicate a work order to a user device, such as the user device 115 illustrated in FIG. 1. In this regard, the switching module 169 may direct a field technician to manually actuate (i.e., open or close) one or more manual switches associated with the switching operation. Additionally, at block 255, the switching module 169 may receive an indication or message including confirmation that the switching operation has been completed. For example, at least a portion of a confirmation message transmitted by the user device 115 may be provided to the switching module 169. In certain embodiments, as described above for automatic switching operations, the switching module 169 may await receipt of confirmation prior to advancing within a queue of switching operations. Following block 255, operations may continue at block 260.

At block 260, which may be optional in certain embodiments of the invention, a determination may be made as to whether any notification events have been triggered. In other words, a determination may be made as to whether notification messages associated with the switching operations should be transmitted or communicated to any number of other components or systems associated with a utility provider, such as a load balancing controller, one or more DERs, and/or an asset management system. As desired, a wide variety of suitable parameters and/or conditions may be analyzed in order to determine whether a notification event has been triggered. For example, one or more parameters may define predetermined time intervals (e.g., once a minute, once every five minutes, once every ten minutes, etc.), predetermined numbers of executing switching operations (e.g., once every five switching operations, once every ten switching operations, etc.), and/or predetermined points within a switch plan at which notification events should be identified and/or triggered. As one example, a load balancing notification event may be triggered every minute or following the completion of a certain number of switching operations.

If it is determined at block 260 that no notification events have been triggered, then operations may continue at block 220, and a next switching operation may be selected. If, however, it is determined at block 260 that one or more notification events have been triggered, then operations may continue at block 265. At block 265, one or more triggered notifications may be communicated, and any received responses to the notifications may be processed. One example of the operations that may be performed at block 265 is described in greater detail below with reference to FIG. 3. Following block 265, operations may continue at block 220, and a next switching operation may be selected.

The method 200 of FIG. 2 may end following block 225.

Figure 3:
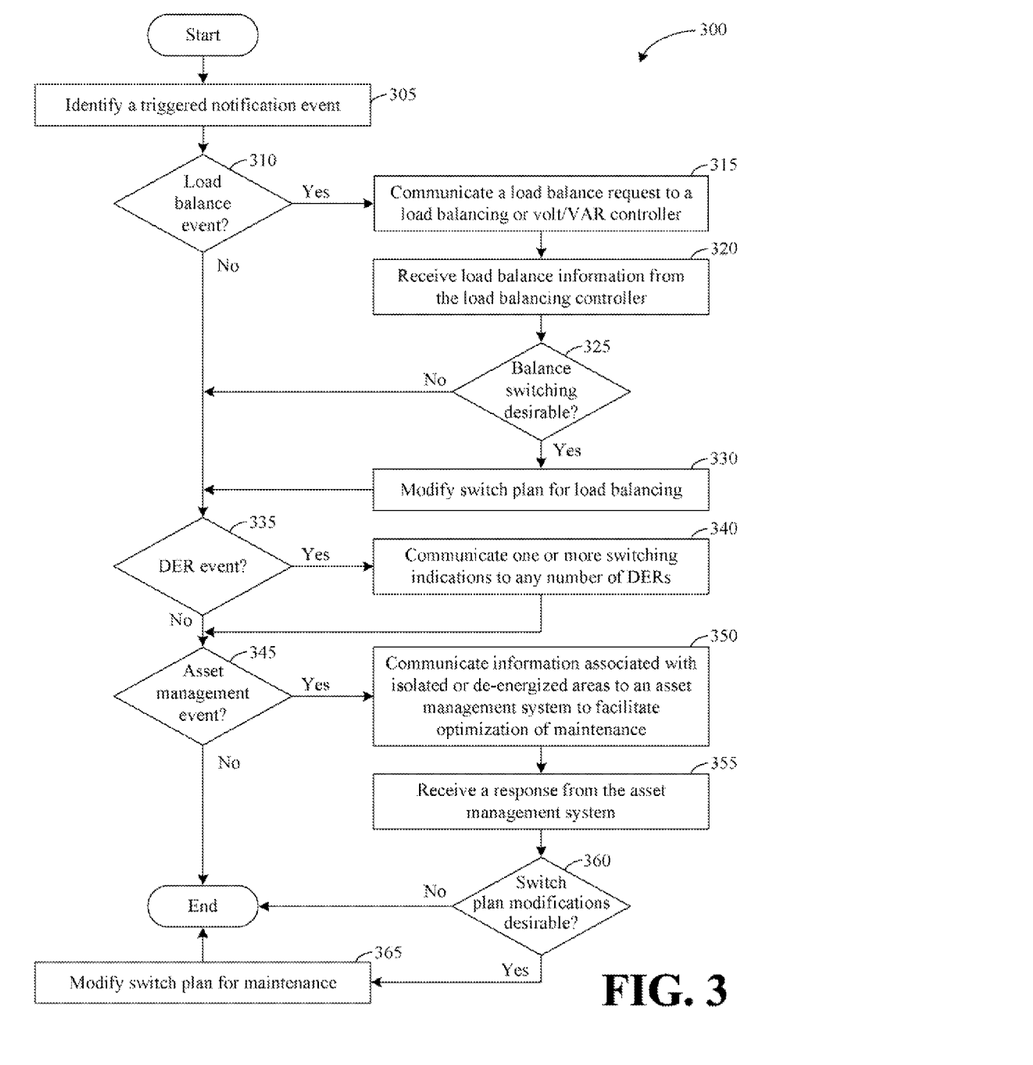
FIG. 3 is a flow diagram of an example method for generating and processing notifications and/or alerts during the execution of a switch plan, according to an illustrative embodiment of the invention.

FIG. 3 is a flow diagram of an example method 300 for generating and processing notifications and/or alerts during the execution of a switch plan according to an illustrative embodiment of the invention. The method 300 may illustrate one example of the operations that may be performed at block 265 illustrated in FIG. 2. As such, the method 300 may be utilized in association with one or more switching control systems, such as the system 100 illustrated in FIG. 1. Additionally, in certain embodiments, the operations of the method 300 may be performed by a suitable switching module, such as the switching module 169 illustrated in FIG. 1.

The method 300 may begin at block 305. At block 305, a triggered notification event may be identified. Additionally, as desired, a wide variety of information associated with the triggered notification event may be identified, such as a type associated with the notification event and/or information associated with one or more systems (e.g., a load balancing system, one or more DERs, an asset management system, etc.) to which a notification message should be communicated.

At block 310, a determination may be made as to whether the triggered notification event is a load balance event. In other words, a determination may be made as to whether a load balancing analysis should be requested and/or performed. If it is determined at block 310 that the triggered notification event is not a load balance event, then operations may continue at block 335 described in greater detail below. If, however, it is determined at block 310 that the triggered notification event is a load balance event, then operations may continue at block 315.

At block 315, a load balance request may be communicated to a suitable load balance or volt/VAR controller, such as the load balancing controller 140 illustrated in FIG. 1. The request may include a request to conduct a load balancing analysis in order to determine whether any load balancing (i.e., balancing of power generation and power demand) should be performed within the power distribution network. The load balancing controller 140 may conduct the requested analysis, and load balance information may be received from the load balancing controller 140 at block 320. In certain embodiments, additional switching operations may be directed in order to facilitate load balancing. For example, additional switches for capacitor banks, voltage regulators, and/or on-load tap chargers may be actuated in order to facilitate load balances. Additionally, in certain embodiments, load balancing information may be examined by the switch controller 105 and/or the load balancing controller 140 in order to determine an optimal switching plan.

At block 325, a determination may be made as to whether any balance switching and/or other modifications to the switch plan are desirable based at least in part on the results of a load balance analysis. In other words, a determination may be made as to whether additional load balancing switching operations are desirable. If it is determined at block 325 that no balance switching is desirable, then operations may continue at block 335 described in greater detail below. If, however, it is determined at block 325 that balance switching is desirable, then operations may continue at block 330. At block 330, the switch plan may be dynamically modified or adjusted to facilitate load balances. For example, load balancing switching operations may be inserted into the switch plan. As another example, the switch plan may be optimized for load balancing purposes. During the optimization, any number of switching operations may be added and/or suppressed in order to facilitate an optimal load balance.

At block 335, a determination may be made as to whether the triggered notification event is a DER event. In other words, a determination may be made as to whether one or more distributed energy resources, such as the DERs 145 illustrated in FIG. 1, should be notified of one or more completed switching operations and/or one or more scheduled switching operations. In this regard, one or more DERs may conduct an analysis of switching operations in order to avoid power curtailment. If it is determined at block 335 that the triggered notification event is not a DER event, then operations may continue at block 345 described in greater detail below. If, however, it is determined at block 335 that the triggered notification event is a DER event, then operations may continue at block 340. At block 340, one or more switching operations may be communicated to any number of DERs or distributed energy sources. Operations may then continue at block 345.

At block 345, a determination may be made as to whether the triggered notification event is an asset management event. In other words, a determination may be made as to whether one or more maintenance schedules should be analyzed in conjunction with the switch plan and/or switching operations. If it is determined at block 345 that the triggered notification event is not an asset management event, then operations may end. If, however, it is determined at block 345 that the triggered notification event is an asset management event, then operations may continue at block 350. At block 350, information associated with one or more isolated or de-energized areas of the power distribution network may be communicated to a suitable asset management system, such as the asset management system 150 illustrated in FIG. 1. In this regard, maintenance associated with the isolated areas may be scheduled and/or rescheduled to coordinate with the switching operations. For example, the asset management system 150 may reschedule maintenance procedures to coincide with downtime associated with the switch plan.

Additionally, in certain embodiments, a switch plan may be modified in order to facilitate maintenance procedures. For example, a response to the notification may be communicated by the asset management system 150 to the switching module 169, and the response may be received at block 355. A wide variety of suitable information may be received in the response, such as information associated with scheduled maintenance procedures, information associated with rescheduled maintenance procedures, and/or one or more requests for additional time to complete various maintenance procedures that have been undertaken and/or that have been rescheduled. At block 360, a determination may be made as to whether any switch plan modification are desirable in order to facilitate the completion of one or more maintenance procedures. If it is determined at block 360 that no switch plan modifications are desirable, then operations may end. If, however, it is determined at block 360 that one or more switch plan modifications are desired, then operations may continue at block 365. At block 365, the switch plan may be dynamically modified in order to facilitate the completion of any number of maintenance procedures and/or tasks. In this regard, an optimal maintenance schedule may be determined in conjunction with the various switching operations.

The method 300 of FIG. 3 may end following either of blocks 345, 360, or 365.

The operations described and shown in the methods 200, 300 of FIGS. 2-3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-3 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
   identifying, by a control system associated with a power utility and comprising one or more computers, a switch plan for restoring electrical power to a power distribution network following a power outage;
   directing, by the control system, notifications to one or more components of the power distribution network, wherein the one or more components comprises one or more of: a load balancing controller, one or more distributed energy resources (DERs), or an asset management system;
   receiving, by the control system, communication from the one or more components of the power distribution network, wherein the switch plan is dynamically modified based upon the communication received;
   identifying, by the control system, a plurality of switching operations associated with the switch plan, the plurality of switching operations comprising at least one automatic switching operation and at least one manual switching operation;
   directing, by the control system, to a mobile user device a communication of a message to execute the at least one manual switching operation to facilitate execution of the switch plan;
   receiving, by the control system, an indication that at least one switching operation has been completed;
   dynamically modifying, by the control system, the switch plan based at least in part on the received indication, and one or more conditions associated with the power distribution network, wherein the one or more conditions comprises one or more of: phase balancing analysis, load balancing analysis, voltage conditions, frequency conditions, reactive power conditions, or maintenance information;
   coordinating, by the control system, a synchronized execution of the plurality of switching operations based at least upon the communication received from the one or more components, indications that the switching operations have been completed, and/or the one more conditions associated with the power distribution network, wherein the synchronized execution facilitates the dynamically modified switch plan and executes a next switching operation included in the plurality of switching operations based at least in part upon the received indication that one switching operation has been completed;
   identifying, by the control system based at least in part on the switch plan, an area of the power distribution network isolated as a result of the plurality of switching operations; and
   directing, by the control system, an optimization of maintenance associated with the identified area, wherein the directing comprises:
      communicating, by the control system to an asset management system, information associated with a power outage for the isolated area, wherein the asset management system schedules maintenance associated with the isolated area based at least in part on the received information;
      receiving, by the control system from the asset management system, scheduled maintenance information for the isolated area; and
      modifying, by the control system based at least in part upon the scheduled maintenance information, the switch plan.

2. The method of claim 1, wherein coordinating the synchronized execution of the plurality of switching operations comprises:
   determining, by the control system, an order for executing the plurality of switching operations; and
   directing, by the control system based at least in part upon the determined order, the synchronized execution of each of the plurality of switching operations.

3. The method of claim 2, wherein directing the synchronized execution of each of the plurality of switching operations comprises:
   determining, by the control system for each of the plurality of switching operations, whether the switching operation is an automatic switching operation or a manual switching operation; and
   directing, by the control system based at least in part on the determinations, the synchronized execution of the switching operation.

4. The method of claim 3, wherein it is determined that the switching operation is an automatic switching operation, and wherein directing the synchronized execution of the switching operation comprises:

directing, by the control system, communication of a command to execute the switching operation to an automatic switching control system.

5. The method of claim 1, further comprising:
directing, by the control system, conduction of a load balancing analysis within the power distribution network; and
modifying, by the control system based at least in part upon the load balancing analysis, the switch plan.

6. The method of claim 1, further comprising:
communicating, by the control system to a distributed energy resource, an indication that one or more switching operations have been executed,
wherein the distributed energy resource determines, based at least in part on the indication, an effect of the one or more switching operations on a power delivery associated with the distributed energy resource.

7. A system, comprising:
at least one memory configured to store computer-executable instructions; and
at least one processor configured to access the at least one memory and execute the computer-executable instructions to:
direct notifications to one or more components of the power distribution network, wherein the one or more components comprises one or more of: a load balancing controller, one or more distributed energy resources (DERs), or an asset management system;
receive communication from the one or more components of the power distribution network, wherein the switch plan is dynamically modified based upon the communication received;
identify a switch plan for restoring electrical power to a power distribution network following a power outage;
identify a plurality of switching operations associated with the switch plan, the plurality of switching operations comprising at least one automatic switching operation and at least one manual switching operation;
direct, to a mobile user device, a communication of a message to execute the at least one manual switching operation to facilitate execution of the switch plan;
receive an indication that at least one switching operation has been completed;
dynamically modify the switch plan based at least in part on the received indication, and one or more conditions associated with the power distribution network, wherein the one or more conditions comprises one or more of: phase balancing analysis, load balancing analysis, voltage conditions, frequency conditions, reactive power conditions, or maintenance information;
coordinate a synchronized execution of the plurality of switching operations based at least upon the communication received from the one or more components, indications that the switching operations have been completed, and/or the one more conditions associated with the power distribution network, wherein the synchronized execution facilitates the dynamically modified switch plan and executes a next switching operation included in the plurality of switching operations based at least in part upon the received indication that one switching operation has been completed
identify, based at least in part on the switch plan, an area of the power distribution network isolated as a result of the plurality of switching operations; and
direct an optimization of maintenance associated with the identified area, and further comprising:
direct the communication of information associated with a power outage for the isolated area to an asset management system, wherein the asset management system schedules maintenance associated with the isolated area based at least in part on the received information;
receive, from the asset management system, scheduled maintenance information for the isolated area; and
modify, based at least in part upon the scheduled maintenance information, the switch plan.

8. The system of claim 7, wherein the at least one processor is configured to coordinate the synchronized execution of the plurality of switching operations by executing the computer-executable instructions to:
determine an order for executing the plurality of switching operations; and
direct, based at least in part upon the determined order, the synchronized execution of each of the plurality of switching operations.

9. The system of claim 8, wherein directing the synchronized execution of each of the plurality of switching operations comprises:
determining, by the control system for each of the plurality of switching operations, whether the switching operation is an automatic switching operation or a manual switching operation; and
directing, by the control system based at least in part on the determinations, the synchronized execution of the switching operation.

10. The system of claim 9, wherein the switching operation is an automatic switching operation, and wherein the at least one processor is configured to direct the synchronized execution of the switching operation by executing the computer-executable instructions to:
direct communication of a command to execute the switching operation to an automatic switching control system.

11. The system of claim 7, wherein the at least one processor is further configured to execute the computer-executable instructions to:
direct conduction of a load balancing analysis within the power distribution network; and
modify, based at least in part upon the load balancing analysis, the switch plan.

12. The system of claim 7, wherein the at least one processor is further configured to execute the computer-executable instructions to:
direct the communication of an indication that one or more switching operations have been executed to a distributed energy resource, the distributed energy resource configured to determine based at least in part on the indication, an effect of the one or more switching operations on a power delivery associated with the distributed energy resource.

* * * * *